US012459548B2

(12) United States Patent
Rusich et al.

(10) Patent No.: US 12,459,548 B2
(45) Date of Patent: Nov. 4, 2025

(54) HYPERLOOP ENVIRONMENTAL CONTROL SYSTEM

(71) Applicant: Hamilton Sundstrand Corporation, Charlotte, NC (US)

(72) Inventors: Richard Rusich, Ellington, CT (US); Louis J. Bruno, Ellington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 172 days.

(21) Appl. No.: 18/181,008

(22) Filed: Mar. 9, 2023

(65) Prior Publication Data
US 2024/0300551 A1 Sep. 12, 2024

(51) Int. Cl.
  *B61D 27/00* (2006.01)
  *F25B 9/00* (2006.01)
  *F25B 9/06* (2006.01)

(52) U.S. Cl.
  CPC .......... *B61D 27/0018* (2013.01); *F25B 9/004* (2013.01); *F25B 9/06* (2013.01)

(58) Field of Classification Search
  CPC ........ B61D 27/0018; B61D 2013/0603; F25B 9/004; F25B 9/06
  See application file for complete search history.

(56) References Cited

U.S. PATENT DOCUMENTS

| | | | |
|---|---|---|---|
| 4,261,178 A * | 4/1981 | Cain | B09B 3/00 62/149 |
| 4,374,469 A * | 2/1983 | Rannenberg | B64D 13/06 62/402 |
| 6,199,387 B1 | 3/2001 | Sauterleute | |
| 6,457,318 B1 | 10/2002 | Lui et al. | |
| 6,595,010 B2 | 7/2003 | Sauterleute et al. | |
| 6,615,606 B2 | 9/2003 | Zywiak | |
| 6,845,630 B2 | 1/2005 | Bruno et al. | |
| 7,222,499 B2 | 5/2007 | Hunt | |
| 8,418,495 B2 | 4/2013 | Merritt et al. | |
| 9,487,300 B2 | 11/2016 | Klimpel et al. | |

(Continued)

FOREIGN PATENT DOCUMENTS

| | | |
|---|---|---|
| CN | 107472274 A | 12/2017 |
| CN | 108583602 A | 9/2018 |

OTHER PUBLICATIONS

Extended European Search Report for European Application No. 24160355.4; Report Mail Date Jul. 19, 2024 (6 Pages).

*Primary Examiner* — David J Teitelbaum
(74) *Attorney, Agent, or Firm* — CANTOR COLBURN LLP

(57) ABSTRACT

An environmental control system for conditioning a cabin of a vehicle positioned in an enclosed air-evacuated environment includes a first inlet for receiving a first medium and at least one inlet for receiving a second medium. The second medium includes a first flow of the second medium and a second flow of the second medium. A thermodynamic device is fluidly coupled to the first inlet and includes a compressor and at least one turbine operably coupled by a shaft. The first medium is provided to the compressor and the at least one turbine in series. A first mixing point is fluidly coupled to the second inlet and an outlet of the at least one turbine. A regeneration heat exchanger is fluidly coupled to another outlet of the thermodynamic device and to the at least one inlet.

12 Claims, 1 Drawing Sheet

(56) References Cited

U.S. PATENT DOCUMENTS

| | | | |
|---|---|---|---|
| 9,656,755 | B2 | 5/2017 | Durbin et al. |
| 10,745,137 | B2 | 8/2020 | Army et al. |
| 10,850,854 | B2 | 12/2020 | Bruno |
| 10,940,951 | B2 | 3/2021 | Bruno |
| 11,053,010 | B2 | 7/2021 | Bruno et al. |
| 11,104,442 | B2 | 8/2021 | Bruno |
| 11,136,050 | B2 | 10/2021 | Frankenberger et al. |
| 11,174,031 | B2 | 11/2021 | Ho et al. |
| 11,192,655 | B2 | 12/2021 | Bruno et al. |
| 11,466,904 | B2 | 10/2022 | Bruno |
| 2011/0005244 | A1* | 1/2011 | Finney ............... F25B 9/06 62/87 |
| 2019/0225343 | A1* | 7/2019 | Bruno ............... B64D 13/06 |
| 2019/0300181 | A1* | 10/2019 | Shea ............... F25B 9/06 |
| 2020/0010202 | A1* | 1/2020 | Bammann ............ B64D 13/06 |
| 2020/0189620 | A1* | 6/2020 | Bahman ............. B61B 1/02 |
| 2021/0129629 | A1 | 5/2021 | Frankenberger et al. |
| 2023/0303252 | A1* | 9/2023 | Vignali ............. B64D 13/08 |

\* cited by examiner

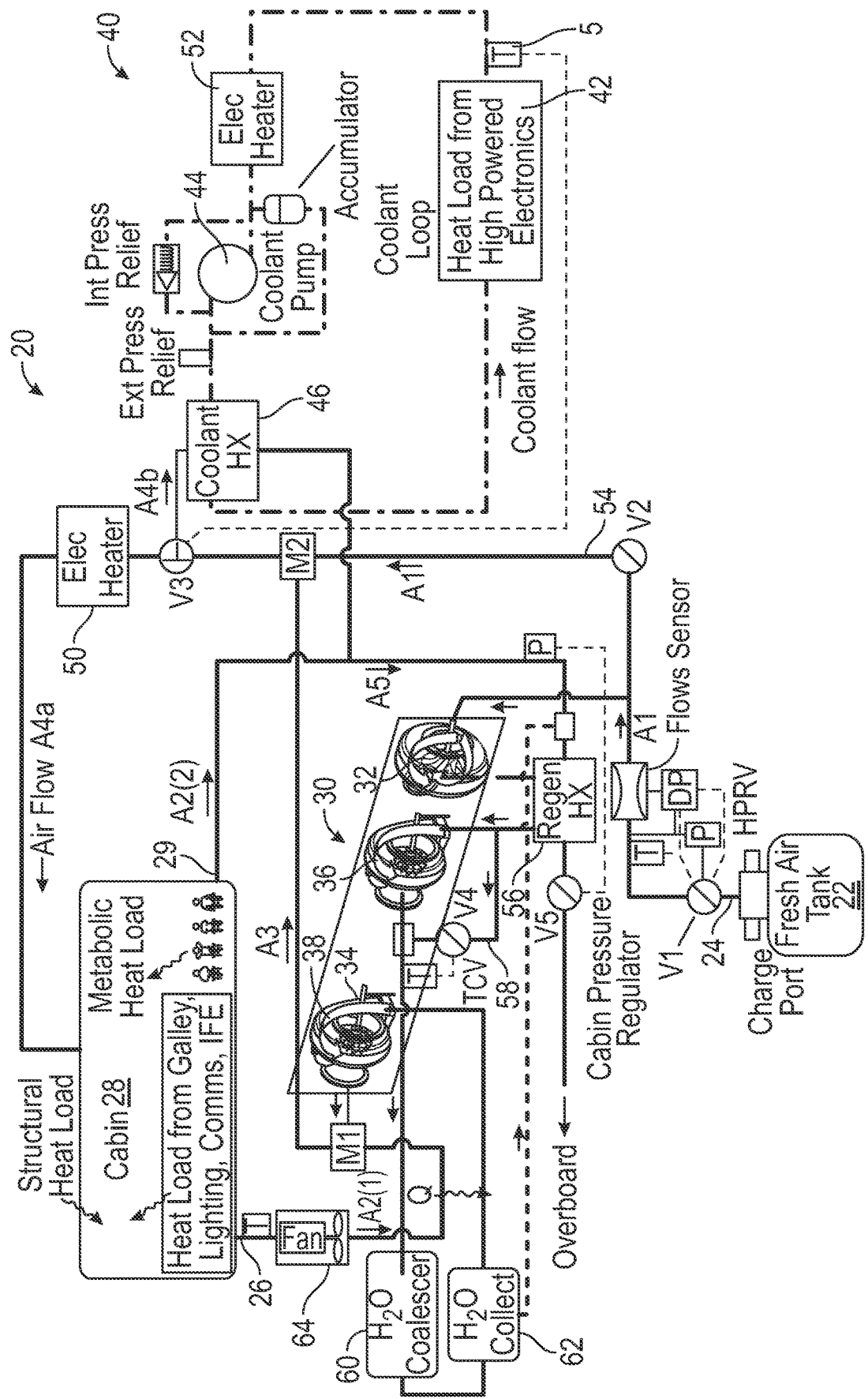

HYPERLOOP ENVIRONMENTAL CONTROL SYSTEM

BACKGROUND

The present disclosure relates to an environmental control system of a vehicle, and more particularly, to an environmental control system (ECS) for a vehicle travelling in a low pressure or zero pressure environment.

In general, a high-speed public transportation concept called the hyperloop has been proposed that can include a vehicle similar to a train car that travels inside of a tube. The air in the tube can be evacuated to a very deep vacuum, allowing the train to reach very high speeds without incurring the high-power demand that would otherwise be needed to overcome the high aerodynamic drag at normal atmospheric pressure. An air lock can permit passenger boarding and disembarking from the train station to the train without discharging the atmospheric air in the station into the vacuum in the tube.

As with similar transportation vehicles, environmental control of the occupied cabin is generally required to maintain adequate comfort and to provide heating, cooling and/or a continual supply of fresh air. Some typical methods used to provide air conditioning may not be conducive to this application. For example, many air conditioning systems exist which provide cool air to the cabin and on-board electronics may draw air from or ultimately exhaust the heat to the ambient atmosphere via convection heat transfer. When the ambient atmosphere is non-existent, as in space applications, heat can be rejected to deep space via radiation heat transfer. In the case of the hyperloop, there is little to no atmosphere in the tube, so rejecting heat into the tube via convection may not be practical while maintaining a reasonably sized heat exchanger to reject the heat. Moreover, heat rejection via radiation may also not be practical, since unlike radiating to space, which is near absolute zero degrees in temperature, the walls of the tube can be warmer than inside the cabin when the outside ambient temperature is warm. Moreover, while the train is moving at high speed, the amount of available electrical power consumption is limited since power is generally supplied solely by on-board batteries that have a limited quantity of electrical energy.

BRIEF DESCRIPTION

According to an embodiment, an environmental control system for conditioning a cabin of a vehicle positioned in an enclosed air-evacuated environment includes a first inlet for receiving a first medium and at least one inlet for receiving a second medium. The second medium includes a first flow of the second medium and a second flow of the second medium. A thermodynamic device is fluidly coupled to the first inlet and includes a compressor and at least one turbine operably coupled by a shaft. The first medium is provided to the compressor and the at least one turbine in series. A first mixing point is fluidly coupled to the second inlet and an outlet of the at least one turbine. A regeneration heat exchanger is fluidly coupled to another outlet of the thermodynamic device and to the at least one inlet.

In addition to one or more of the features described herein, or as an alternative, in further embodiments the regeneration heat exchanger is fluidly coupled to and is located directly downstream from the compressor.

In addition to one or more of the features described herein, or as an alternative, in further embodiments the at least one turbine includes a first turbine and a second turbine and an outlet of the first turbine is fluidly coupled to an inlet of the second turbine.

In addition to one or more of the features described herein, or as an alternative, in further embodiments including at least one of a water coalescer and a water collector located downstream from and fluidly coupled to the outlet of the first turbine and upstream from and fluidly coupled to the inlet of the second turbine.

In addition to one or more of the features described herein, or as an alternative, in further embodiments a bypass conduit fluidly connects a first outlet of the regeneration heat exchanger and the outlet of the first turbine. A valve is associated with the bypass conduit and is operable to control the flow of the first medium within the bypass conduit.

In addition to one or more of the features described herein, or as an alternative, in further embodiments a bypass conduit is fluidly connected to the first inlet and is arranged in parallel with an inlet of the compressor. A valve is associated with the bypass conduit and is operable to control the flow of the first medium within the bypass conduit.

In addition to one or more of the features described herein, or as an alternative, in further embodiments including a second mixing point fluidly coupled to the first mixing point and to the bypass conduit. A flow output from the second mixing point is a conditioned medium.

In addition to one or more of the features described herein, or as an alternative, in further embodiments a portion of the conditioned medium and the second flow of the second medium is mixed and used to cool the first medium at the regeneration heat exchanger.

In addition to one or more of the features described herein, or as an alternative, in further embodiments a portion of the conditioned medium is provided to a heat exchanger of a cooling system.

In addition to one or more of the features described herein, or as an alternative, in further embodiments a circulation fan is operably coupled to the cabin and to the second inlet.

In addition to one or more of the features described herein, or as an alternative, in further embodiments at least one vessel of a pressurized first medium is located on board the vehicle.

In addition to one or more of the features described herein, or as an alternative, in further embodiments the vehicle is a train.

According to an embodiment, a method of operating an environmental control system to condition a cabin of a vehicle positioned in an enclosed, air-evacuated tube includes compressing a first medium within a compressor of a thermodynamic device to form a compressed first medium, extracting energy from the compressed first medium at at least one turbine of the thermodynamic device to form an expanded first medium, mixing a first flow of a second medium with the expanded first medium to form a third medium, and cooling the compressed first medium using a second flow of the second medium at a regeneration heat exchanger. The extracted energy from the compressed first medium at the at least one turbine is used to drive the compressor.

In addition to one or more of the features described herein, or as an alternative, in further embodiments the at least one turbine further comprises a first turbine and a second turbine and the extracting energy from the compressed first medium at the at least one turbine of the thermodynamic device includes extracting energy from the compressed first medium at the first turbine to form the expanded first medium and extracting energy from the expanded first medium at the second turbine to form a further expanded first medium.

In addition to one or more of the features described herein, or as an alternative, in further embodiments drying the expanded first medium prior to extracting energy from the expanded first medium at the second turbine.

In addition to one or more of the features described herein, or as an alternative, in further embodiments mixing the third medium with a flow of the first medium provided from a bypass conduit to form a conditioned medium. The flow of the first medium provided from the bypass conduit has bypassed the thermodynamic device.

In addition to one or more of the features described herein, or as an alternative, in further embodiments mixing a portion of the conditioned medium with the second flow of the second medium upstream from the regeneration heat exchanger.

In addition to one or more of the features described herein, or as an alternative, in further embodiments providing a first portion of a flow of the conditioned medium to the cabin and providing a second portion of the flow of the conditioned medium to a cooling system.

In addition to one or more of the features described herein, or as an alternative, in further embodiments providing the second portion of the flow of the conditioned medium to the cooling system includes removing heat from the cooling system.

In addition to one or more of the features described herein, or as an alternative, in further embodiments mixing the second portion of the flow of the conditioned medium provided from the cooling system with the second flow of the second medium upstream from the regeneration heat exchanger.

BRIEF DESCRIPTION OF THE DRAWINGS

The following descriptions should not be considered limiting in any way. With reference to the accompanying drawings, like elements are numbered alike:

The FIGURE is a schematic diagram of an example environmental control system (ECS) for a vehicle travelling within a hyperloop tube according to an embodiment.

DETAILED DESCRIPTION

A detailed description of one or more embodiments of the disclosed apparatus and method are presented herein by way of exemplification and not limitation with reference to the FIGURES.

The example embodiments disclosed herein are illustrative of a hyperloop environmental control system, and assemblies of the present disclosure and methods/techniques thereof. It should be understood, however, that the disclosed embodiments are merely examples of the present disclosure, which may be embodied in various forms. Therefore, details disclosed herein with reference to example hyperloop environmental control systems and associated processes/techniques of fabrication/assembly and use are not to be interpreted as limiting, but merely as the basis for teaching one skilled in the art how to make and use the systems/assemblies and/or alternative systems/assemblies of the present disclosure.

With reference now to the FIGURE, an example of an environmental control system 20 suitable for use with a vehicle movable within an enclosed air-evacuated environment is illustrated. The air-evacuated environment has a substantially zero-pressure or is a vacuum. In an embodiment, the vehicle is a car or train movable through a tube of a hyperloop system. As shown, the environmental control system 20 includes one or more vessels 22 located on-board the vehicle and configured to store a pressurized medium therein, such as high-pressure air for example. In an embodiment, the pressure of the medium within the at least one vessel 22 is between about 2000 psi about 3000 psi. The one or more vessels 22 may be considered a first fluid source and are fluidly coupled to a first inlet 24 of the environmental control system 20 to deliver a controlled flow of a first medium A1 to the environmental control system 20. The one or more vessels 22 may be filled, refilled, or replaced when the vehicle is stopped at a station or other facility.

The environmental control system 20 may additionally receive a flow of second medium A2 at a second inlet 26. In one embodiment, the second inlet 26 is operably coupled to a volume 28, such as the cabin or chamber of the vehicle in which the people are typically located. In such embodiments, the second medium A2 is cabin recirculation air. The environmental control system 20 is operable to provide a conditioned flow of one or both of the first medium A1 and the second medium A2 to the cabin 28 at standard atmospheric pressure of about 14.7 psi.

In the illustrated, non-limiting embodiment, the environmental control system additionally includes a third inlet 29 for receiving another flow of the second medium. Accordingly, the flow of the second medium provided via the second inlet 26 may be referred to as a first flow of the second medium A2(1) and the flow of second medium provided via the third inlet 29 may be referred to as a second flow of the second medium A2(2). Although a separate first and second inlet for the second medium A2 is illustrated, it should be appreciated that in other embodiments, the environmental control system 20 may have a single inlet for receiving the second medium A2 and the flow of second medium may be split into multiple flows similar to the first flow and the second flow.

The environmental control system 20 may include at least one thermodynamic device 30, and in some embodiments, may include a plurality of thermodynamic devices. A thermodynamic device 30, as described herein, is a mechanical device that includes one or more components for performing thermodynamic work on a medium (e.g., extracts work from or applies work to the first medium A1 or the second medium A2 by raising and/or lowering pressure and by raising and/or lowering temperature). Examples of a thermodynamic device 30 include an air cycle machine, a two-wheel air cycle machine, a three-wheel air cycle machine, a four-wheel air cycle machine etc.

The single thermodynamic device 30 shown in the FIG. includes a compressor 32 and at least one turbine operably coupled by a shaft 34. In the illustrated, non-limiting embodiment, the thermodynamic device includes 30 a first turbine 36 and a second turbine 38. However, embodiments where the thermodynamic device 30 includes a single turbine, or alternatively, more than two turbines are also within the scope of the disclosure.

A compressor, such as compressor 32 for example, is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. A turbine, such as first turbine 36 or second turbine 38 for example, is a mechanical device that expands a medium and extracts work therefrom (also referred to as extracting energy) to drive the compressor 32 via the shaft 34. The turbines 36, 38 may include a nozzle (not shown) configured to accelerate the medium supplied thereto for entry into an impeller of the turbine.

In addition to providing a conditioned medium to the cabin 28, the environmental control system 20 may be used to transfer or redistribute heat between various systems onboard the vehicle. In an embodiment, the environmental control system 20 is operably coupled to a cooling system 40 used to cool high-powered electronics 42 located onboard the vehicle. As shown, a coolant, such as propylene glycol or ethylene glycol for example, is configured to circulate through the electronics 42 via a coolant pump 44, then is then provided to an electronics heat exchanger 46. In the illustrated, non-limiting embodiment, the environmental control system 20 is operably coupled to the cooling system 40 via the electronics heat exchanger 46. Accordingly, at the electronics heat exchanger 46, during operation of the environmental control system 20 in a "cooling mode" where the air provided to the cabin 28 is intended to reduce the temperature therein, heat is transferred from the coolant to the relatively cool medium of the environmental control system 20. Heat may also be transferred from the coolant to the relatively cool medium of the environmental control system 20 during operation in a "heating mode" where the air provided to the cabin is intended to increase the temperature therein.

The elements of the environmental control system 20 are connected via valves, tubes, pipes, conduits and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the environmental control system 20 can be regulated to a desired value. For instance, a first valve V1, such as an airflow regulator for example, is configured to control the flow of the first medium A1 provided to the environmental control system 20 via the first inlet 24. A second valve V2 may be operable to selectively divert the flow of the first medium to bypass the substantially entire environmental control system 20, including the thermodynamic device 30 and one or more heat exchangers. A third valve can control the flow of a conditioned medium to both the cabin 28 and to the cooling system 40 and a fourth valve V4 may be operable to allow a portion of a medium to bypass a portion of the thermodynamic device 30, such as the first turbine 36 for example. The environmental control system 20 may additionally include a V5 operable to exhaust a flow of medium from the cabin 28 or the environmental control system 20 overboard from the vehicle, such as into the atmosphere surrounding the exterior of the vehicle.

One or more of the valves V1-V5 may be configured to receive commands from an ECS controller (not shown), such as in response to feedback provided from one or more sensors S located in specific/desired locations in the environmental control system 20. Although various pressure and temperature sensors are illustrated, it should be appreciated that other sensors operable to monitor any suitable parameter of the environmental control system 20 and/or the cooling system 40 are within the scope of the disclosure.

Furthermore, a heater 50, such as an electrical heater for example, may also be provided for instances where the conditioned medium to be delivered to the cabin 28 needs to be heated. In such embodiments, the heater 50 may be arranged directly upstream from the cabin 28 relative to a flow of the conditioned medium. Alternatively, or in addition, a heater 52, such as an electrical heater, may be provided in the cooling system 40 for instances where the conditioned medium to be delivered to the cabin 28 needs additional heat beyond the load exhausted by the electronics 42.

In operation, a flow of the first medium A1 at the first inlet 24, controlled by valve V1, is provided to the environmental control system 20. When the downstream valve V2 is in a first position, all or at least a portion of the flow of the first medium A1 is provided to the thermodynamic device 30, such as to the compressor 32 for example. However, when the valve V2 is in a second position, some or all of the flow of the first medium A1 is directed to a bypass conduit 54 arranged in parallel with an inlet of the compressor. Within the bypass conduit 54, the first medium A1 is configured to bypass the entire thermodynamic device 30.

The act of compressing the first medium A1 heats the first medium A1 and increases the pressure thereof to form a compressed first medium. In an embodiment, a first inlet of a regeneration heat exchanger is arranged downstream from the outlet of the compressor 32 and upstream from an inlet of a turbine of the thermodynamic device 30, such as the first turbine for example. In such embodiments, the compressed first medium A1 output from the compressor 32 of the thermodynamic device 30 is cooled within the regeneration heat exchanger 56.

The outlet of the compressor 32 and/or a first outlet of the regeneration heat exchanger 56 may be directly fluidly coupled to an inlet of the first turbine 36. Accordingly, in some embodiments, the first medium A1 is configured to flow through the compressor 32 and the turbine 36 of the thermodynamic device 30 in series. Within the first turbine 36, the first medium A1 is expanded and work is extracted therefrom. As a result, the expanded first medium A1 provided at the outlet of first turbine 36 is cooler and/or has a lower pressure than the first medium A1 provided to the inlet of the first turbine 36. The work extracted from the first medium A1 in the first turbine 36 is used to drive the compressor 32 to compress the first medium A1.

It should be appreciated that in some embodiments, valve V4 may be positioned such that at least a portion of the flow of the first medium A1 output from the first outlet of the regeneration heat exchanger 56 is directed into a bypass conduit 58 and is therefore configured to bypass the first turbine 36. In such embodiments, the flow output from the bypass conduit 58 is configured to mix with the flow output from the first turbine 36 at or directly downstream from the outlet of the first turbine 36. Accordingly, it should be appreciated that the term "expanded first medium A1" used hereafter is intended to include the expanded first medium output from an outlet of the first turbine 36, the first medium A1 from the bypass conduit 58, or some combination thereof.

The first medium A1 is configured to flow through the first turbine 36 and the second turbine 38 in series. The expanded first medium A1 output from the first turbine 36 may be provided directly to an inlet of the second turbine 38. However, in other embodiments, the expanded first medium A1 may be dried upstream from the inlet of the second turbine 38. As shown, a condenser or coalescer 60 and/or a water collector 62 may be located directly downstream from the outlet of the first turbine 36. As the expanded first medium A1 passes through the water coalescer 60 and water collector 62, any liquid present within the first medium A1 is removed.

Within the second turbine 38, the first medium A1 is further expanded and work is extracted therefrom. The work extracted from the first medium A1 in the second turbine 38 is used alone or in combination with the work extracted at the first turbine 36 to drive the compressor 32 to compress the first medium A1. Accordingly, the further expanded first medium A1 provided at the outlet of second turbine 38 is cooler and/or has a lower pressure than the first medium A1 provided to the inlet of the second turbine 38.

At the same time, the first flow A2(1) of the second medium is provided to the second inlet 26 of the environmental control system 20, such as from the cabin 28. Operation of a circulation fan 64 associated with the cabin 28 is configured not only to move the air within the cabin 28, but also to pump the first flow A2(1) of the second medium toward a first mixing point M1 with the first medium A1. As shown, first flow A2(1) of the second medium is configured to mix with the flow of the first medium A1 output from the outlet of the second turbine 38 of the thermodynamic device 30 at the first mixing point M1. The resulting third or mixed medium A3 is then provided to a second mixing point M2 fluidly coupled to the bypass conduit 54. Accordingly, in embodiments where a portion of the first medium A1 provided at the first inlet 24 is directed to the bypass conduit 54, this flow of first medium A1 mixes with the mixed medium A3 at the second mixing point M2 to form a conditioned medium A4. It should be appreciated that in embodiments where none of the first medium A1 is directed into the bypass conduit 54, the conditioned medium A4 output from the second mixing point M2 is simply the third medium A3.

Depending on the operating conditions of the environmental control system 20, in some embodiments, the conditioned medium A4 may be separated into a first portion or flow of conditioned medium A4a used to condition the cabin 28 and a second portion or flow of conditioned medium A4b for use by the cooling system 40. The amount of conditioned medium A4 provided to the cabin 28 and the cooling system 40, respectively, is controlled by the position of the valve V3. In an embodiment, the volume, or the rate at which the first portion of the conditioned medium A4a is provided to the cabin 28 is equal to the volume or rate at which air is exhausted from the cabin 28 overboard, such as via operation of the cabin pressure regulator V5. As a result, the pressure within the cabin 28 remains generally constant.

The second flow A2(2) of the second medium provided to the environmental control system is controlled by operation of the cabin pressure regulator V5. In an embodiment, the second portion of the conditioned medium A4b, after being heated within the cooling system 40, is mixed with the second flow A2(2) of the second medium to form a fifth medium. As shown, this mixing to form the fifth medium A5 may occur upstream from a second inlet of the regeneration heat exchanger 56. The fifth medium A5 may be used as a heat sink at the regeneration heat exchanger 56. Within the regeneration heat exchanger 56, heat transfers from the hot flow of first medium A1 output from the compressor 32 to the warm fifth medium A5. The resulting heated fifth medium A5 may then be exhausted overboard, into the air-evacuated atmosphere at the exterior of the vehicle.

An environmental control system 20 as illustrated and described here provides an efficient system for conditioning a cabin 28 of a vehicle travelling within low pressure environment or a vacuum.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system for conditioning a cabin of a vehicle positioned in an enclosed air-evacuated environment, the environmental control system comprising:
    at least one vessel containing a first source of a medium, wherein the at least one vessel is configured to be located on board a vehicle;
    a first inlet for receiving the first source of the medium;
    at least one inlet for receiving a second source of the medium, the second source of the medium including a first flow of the second source of the medium and a second flow of the second source of the medium, the at least one inlet including a second inlet associated with the first flow of the second source of the medium and a third inlet associated with the second flow of the second source of the medium;
    a thermodynamic device fluidly coupled to the first inlet, the thermodynamic device including a compressor and at least one turbine operably coupled by a shaft, the first source of the medium being provided to the compressor and the at least one turbine in series;
    a first mixing point fluidly coupled to the second inlet and an outlet of the at least one turbine; and
    a regeneration heat exchanger fluidly coupled to another outlet of the thermodynamic device and to the at least one inlet for receiving the second source of the medium.

2. The environmental control system of claim 1, wherein the regeneration heat exchanger is fluidly coupled to and is located directly downstream from the compressor.

3. The environmental control system of claim 1, wherein the at least one turbine further comprises a first turbine having a first turbine outlet and a second turbine having a second turbine outlet, wherein the first turbine outlet is fluidly coupled to an inlet of the second turbine.

4. The environmental control system of claim 3, further comprising at least one of a water coalescer and a water collector located downstream from and fluidly coupled to the outlet of the first turbine and upstream from and fluidly coupled to the inlet of the second turbine.

5. The environmental control system of claim 3, further comprising:
   a bypass conduit fluidly connected to a first outlet of the regeneration heat exchanger and the outlet of the first turbine; and
   a valve associated with the bypass conduit, the valve being operable to control the flow of the first source of the medium within the bypass conduit.

6. The environmental control system of claim 1, further comprising:
   a bypass conduit fluidly connected to the first inlet, the bypass conduit being arranged in parallel with an inlet of the compressor; and
   a valve associated with the bypass conduit, the valve being operable to control the flow of the first source of the medium within the bypass conduit.

7. The environmental control system of claim 6, furthering comprising a second mixing point fluidly coupled to the first mixing point and to the bypass conduit, wherein a flow output from the second mixing point is the medium in a conditioned state.

8. The environmental control system of claim 7, wherein a portion of the conditioned medium and the second flow of the second source of the medium is mixed and used to cool the first source of the medium at the regeneration heat exchanger.

9. The environmental control system of claim 7, wherein a portion of the medium in the conditioned state is provided to a heat exchanger of a cooling system.

10. The environmental control system of claim 1, further comprising a circulation fan operably coupled to the cabin and to the second inlet.

11. The environmental control system of claim 1, further comprising at least one vessel of a pressurized first medium located on board the vehicle.

12. The environmental control system of claim 1, wherein the vehicle is a train.

* * * * *